United States Patent
Novosad et al.

(10) Patent No.: US 11,548,654 B2
(45) Date of Patent: Jan. 10, 2023

(54) PISTON ENGINE POWERED AIRCRAFT ACTUATION SYSTEM

(71) Applicant: HONEYWELL INTERNATIONAL INC., Charlotte, NC (US)

(72) Inventors: Boris Novosad, Levice (SK); Jan Tomas, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 191 days.

(21) Appl. No.: 17/063,118

(22) Filed: Oct. 5, 2020

(65) Prior Publication Data
US 2022/0106051 A1 Apr. 7, 2022

(51) Int. Cl.
| | |
|---|---|
| *B64D 31/14* | (2006.01) |
| *F02B 61/04* | (2006.01) |
| *B64D 27/04* | (2006.01) |
| *B64D 31/04* | (2006.01) |
| *F16C 17/04* | (2006.01) |
| *F16H 25/20* | (2006.01) |

(52) U.S. Cl.
CPC ............. *B64D 31/14* (2013.01); *B64D 27/04* (2013.01); *B64D 31/04* (2013.01); *F02B 61/04* (2013.01); *F16C 17/04* (2013.01); *F16H 25/2025* (2013.01); *F16H 2025/2031* (2013.01); *F16H 2025/2046* (2013.01); *F16H 2025/2081* (2013.01)

(58) Field of Classification Search
CPC ........ B64D 31/00; B64D 31/02; B64D 31/04; B64D 31/06; B64D 31/08; B64D 31/14; F16H 57/0025
See application file for complete search history.

(56) References Cited

U.S. PATENT DOCUMENTS

| | | | | | |
|---|---|---|---|---|---|
| 2,134,756 | A | * | 11/1938 | Gerry | B64D 31/04 74/502 |
| 2,273,334 | A | * | 2/1942 | Shakespeare | G05G 5/18 74/504 |
| 2,274,288 | A | * | 2/1942 | Arens | B64D 31/04 74/502 |
| 3,395,592 | A | * | 8/1968 | Houk | F16C 1/00 74/502 |

(Continued)

FOREIGN PATENT DOCUMENTS

| | | |
|---|---|---|
| CN | 207847774 U | 9/2018 |
| WO | 2019122333 A1 | 6/2019 |
| WO | 2020081615 A1 | 4/2020 |

*Primary Examiner* — Christopher D Hutchens
(74) *Attorney, Agent, or Firm* — Lorenz & Kopf, LLP

(57) ABSTRACT

An actuation system for an aircraft piston engine includes a controller and an actuator. The controller selectively supplies motor control signals to a motor. The actuator includes a housing, a motor, a main rod, a control handle, and an inner rod. The main rod receives a drive torque from the motor and translates in either a first axial direction or a second axial direction. The main rod is responsive to an axial drive force to translate in either the first axial direction or the second axial direction. The inner rod is disposed within the main rod and is movable between a first position, in which main rod rotation causes the main rod to translate, and a second position, in which main rod rotation does not cause the main rod to translate, but application of the axial force to the control handle causes the main rod to translate.

16 Claims, 4 Drawing Sheets

(56) References Cited

U.S. PATENT DOCUMENTS

| | | | |
|---|---|---|---|
| 4,513,235 A * | 4/1985 | Acklam | B60K 26/021 |
| | | | 318/687 |
| 4,947,070 A | 8/1990 | Hill et al. | |
| 8,485,057 B1 * | 7/2013 | McFarlane | B64D 31/04 |
| | | | 74/424.93 |
| 10,604,268 B2 | 3/2020 | Lisio et al. | |
| 2019/0009921 A1 | 1/2019 | Roussey et al. | |
| 2019/0047715 A1 | 2/2019 | Hendrick | |
| 2020/0182183 A1 | 6/2020 | Hunter et al. | |

\* cited by examiner

PISTON ENGINE POWERED AIRCRAFT ACTUATION SYSTEM

TECHNICAL FIELD

The present invention generally relates to aircraft actuation systems, and more particularly relates to an actuation system for an aircraft powered by a piston engine.

BACKGROUND

Many general aviation aircraft are powered by a piston engine. The piston engine is coupled to, and rotates, the propeller to thereby generate forward thrust. If the aircraft is a fixed-pitch propeller aircraft, it is equipped with two pilot controls to control the airspeed—a throttle control and a mixture control. If the aircraft is a variable-pitch propeller aircraft, it is equipped with three pilot controls to control the airspeed—a throttle control, a mixture control, and a propeller control.

For both types of aircraft, the throttle control (typically color-coded black) is used to control the amount of fuel and air entering the engine cylinders, and the mixture control (typically color-coded red) is used to adjust the air/fuel mixture. In variable-pitch propeller aircraft, the propeller control (typically color-coded blue) is used to adjust the propeller rotational speed.

Whether the aircraft has two or three controls, each of the controls is mechanically coupled to either the engine carburetor (throttle control, mixture control) or the propeller governor (propeller control) via a control cable, such as a Bowden cable. The aircraft pilot is required to manually adjust each of these controls during flight to attain the appropriate setting. Currently, there is no commercially available product that can be retrofit into existing piston engine powered aircraft to automate each of these controls.

Hence, there is a need for a system that can be readily retrofit into existing piston engine powered aircraft to automate the throttle, mixture, and (when included) propeller controls. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an actuation system for an aircraft piston engine includes a controller and an actuator. The controller is configured to selectively supply motor control signals to a motor. The actuator is in operable communication with the controller and includes a housing, a motor, a main rod, a control handle, and an inner rod. The motor is mounted on the housing and is coupled to receive the motor control signals. The motor is responsive to the motor control signals to rotate and supply a drive torque. The main rod is disposed at least partially within the housing and has an outer surface and an inner surface that defines a main rod cavity. The main rod is coupled to receive the drive torque from the motor and is configured, in response to the drive torque, to at least selectively translate in either a first axial direction or a second axial direction. The main rod is further configured to receive an axial drive force and is configured, in response to the axial drive force, to at least selectively translate in either the first axial direction or the second axial direction. The control handle is coupled to, and is movable with, the main rod when the main rod is receiving the drive torque. The control handle is dimensioned to be grasped by a hand and to receive at least an axial force. The inner rod is disposed within, and extends from, the main rod cavity. The inner rod is movable between a first position and a second position. In the first position, rotation of the main rod causes the main rod to translate. In the second position, rotation of the main rod does not cause the main rod to translate, but application of the axial force to the control handle causes the main rod to translate.

In another embodiment, an actuation system for an aircraft powered by a piston engine includes a controller and a plurality of actuators. The controller is configured to selectively supply a plurality of motor control signals. The actuators are in operable communication with the controller and each actuator includes a housing, a motor, a main rod, a control handle, and an inner rod. The motor is mounted on the housing and is coupled to receive the motor control signals. The motor is responsive to the motor control signals to rotate and supply a drive torque. The main rod is disposed at least partially within the housing and has an outer surface and an inner surface that defines a main rod cavity. The main rod is coupled to receive the drive torque from the motor and is configured, in response to the drive torque, to at least selectively translate in either a first axial direction or a second axial direction. The main rod is further configured to receive an axial drive force and is configured, in response to the axial drive force, to at least selectively translate in either the first axial direction or the second axial direction. The control handle is coupled to, and is movable with, the main rod when the main rod is receiving the drive torque. The control handle is dimensioned to be grasped by a hand and to receive at least an axial force. The inner rod is disposed within, and extends from, the main rod cavity. The inner rod is movable between a first position and a second position. In the first position, rotation of the main rod causes the main rod to translate. In the second position, rotation of the main rod does not cause the main rod to translate, but application of the axial force to the control handle causes the main rod to translate.

In yet another embodiment, n actuation system for an aircraft piston engine includes a controller and an actuator. The controller is configured to selectively supply motor control signals to a motor. The actuator is in operable communication with the controller and includes a housing, a motor, a drive gear, a driven gear, a main rod, a control handle, and an inner rod. The motor is mounted on the housing and is coupled to receive the motor control signals. The motor is responsive to the motor control signals to rotate and supply a drive torque. The drive gear is coupled to the motor to receive the drive torque therefrom, and the driven gear is meshed with the drive gear and has an opening therein. The main rod is disposed at least partially within the housing and has an outer surface and an inner surface that defines a main rod cavity. The main rod extends through the opening in the driven gear and is selectively engaged by the driven gear when the driven gear is rotating to thereby receive the drive torque from the motor. The main rod is configured, in response to the drive torque, to at least selectively translate, relative to the driven gear, in either a first axial direction or a second axial direction. The main rod is further configured to receive an axial drive force and is configured, in response to the axial drive force, to at least selectively translate, relative to the driven gear, in either the first axial direction or the second axial direction. The control handle is coupled to, and is movable with, the main rod when the main rod is receiving the drive torque. The control handle is dimensioned to be grasped by a hand and to receive at least an axial force. The inner rod is disposed within, and extends from, the main rod cavity. The inner rod is movable between a first position, in which rotation of the main rod causes the main rod to translate, and a second position, in which rotation of the main rod does not cause the main rod to translate, but application of the axial force to the control handle causes the main rod to translate.

Furthermore, other desirable features and characteristics of the actuation system for an aircraft powered by a piston engine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
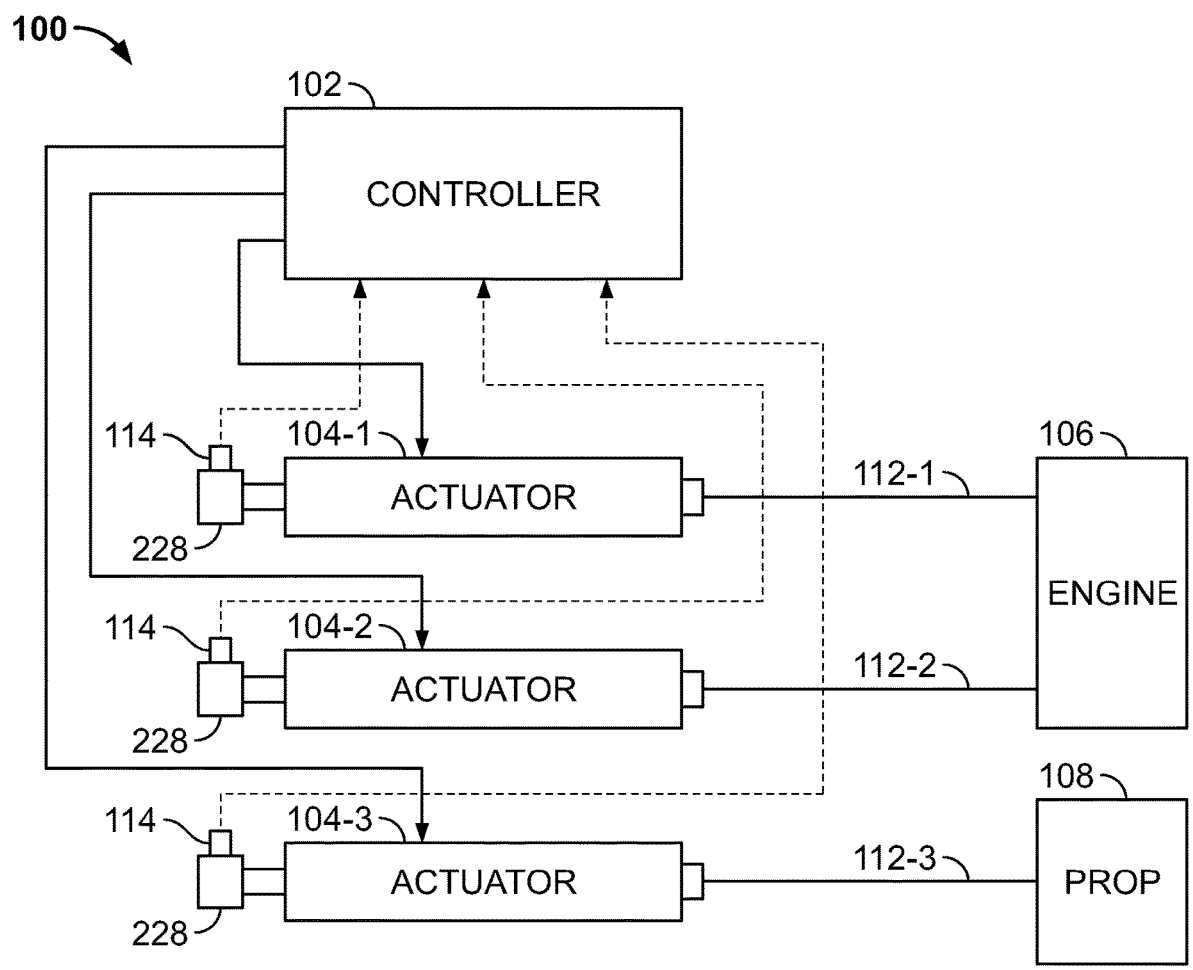
FIG. 1 depicts a functional block diagram of an actuation system for an aircraft powered by a piston engine.

Referring now to FIG. 1, a functional block diagram of one embodiment of an actuation system 100 for an aircraft powered by a piston engine is depicted and includes a controller 102 and a plurality of actuators 104 (104-1, 104-2, 104-3). The controller 102 is configured to selectively supply a plurality of motor control signals to the actuators 104. The controller 102 preferably implements automatic control laws and may be included in, or distributed across, one or more existing avionics systems, or it may be a stand-alone electronic device. Some non-limiting examples of existing avionics systems include a primary flight display (PFD), an autopilot, a flight management system (FMS), a navigation system, and an engine control unit, just to name a few.

The automatic control laws implemented in the controller 102 may be either open-loop or closed-loop controls. Moreover, the control laws may provide one or more basic functions, such as basic airspeed hold, or more advanced functions, such as mixture and thrust/propeller control to optimize fuel consumption or coupling with an active autopilot/flight director mode to provide optimal power settings for a given mode. Regardless of the specific functions, it will be appreciated that the control laws may be implemented as hardware, as software, or various combinations thereof.

Each of the actuators 104 is in operable communication with the controller 102, and each is responsive to the motor control signals it receives to control an associated piston engine aircraft parameter. In the depicted embodiment, the system 100 is included in a variable-pitch propeller aircraft that includes three actuators—104-1, 104-2, 104-3. One actuator 104-1 is used to control the throttle setting of the engine 106, one actuator 104-2 is used to control the air/fuel mixture to the engine 106, and another actuator 104-3 is used to control the propeller 108. It will be appreciated that in other variable-pitch propeller aircraft embodiments, the actuator 104-2 that is used to control the air/fuel mixture to the engine 106 may be a manually controlled actuator, and thus not in operable communication with the controller 102. It will be appreciated that in other embodiments, the system 100 may be included in a fixed-pitch propeller aircraft, which may include only two of the actuators—104-1 and 104-2. It will additionally be appreciated that in other fixed-pitch propeller aircraft embodiments, the actuator 104-2 that is used to control the air/fuel mixture to the engine 106 may be a manually controlled actuator, and thus not in operable communication with the controller 102.

Regardless of the number of actuators 104 included in the system 100, and as FIG. 1 further depicts, each actuator 104 is coupled to its controlled component via a separate control cable 112 (112-1, 112-2, 112-3). In one particular embodiment, each control cable 108 comprises a Bowden cable. Preferably, each actuator 104 is identically configured. One embodiment of an actuator 104 is depicted in FIG. 2, and with reference thereto will now be described.

Figure 2:
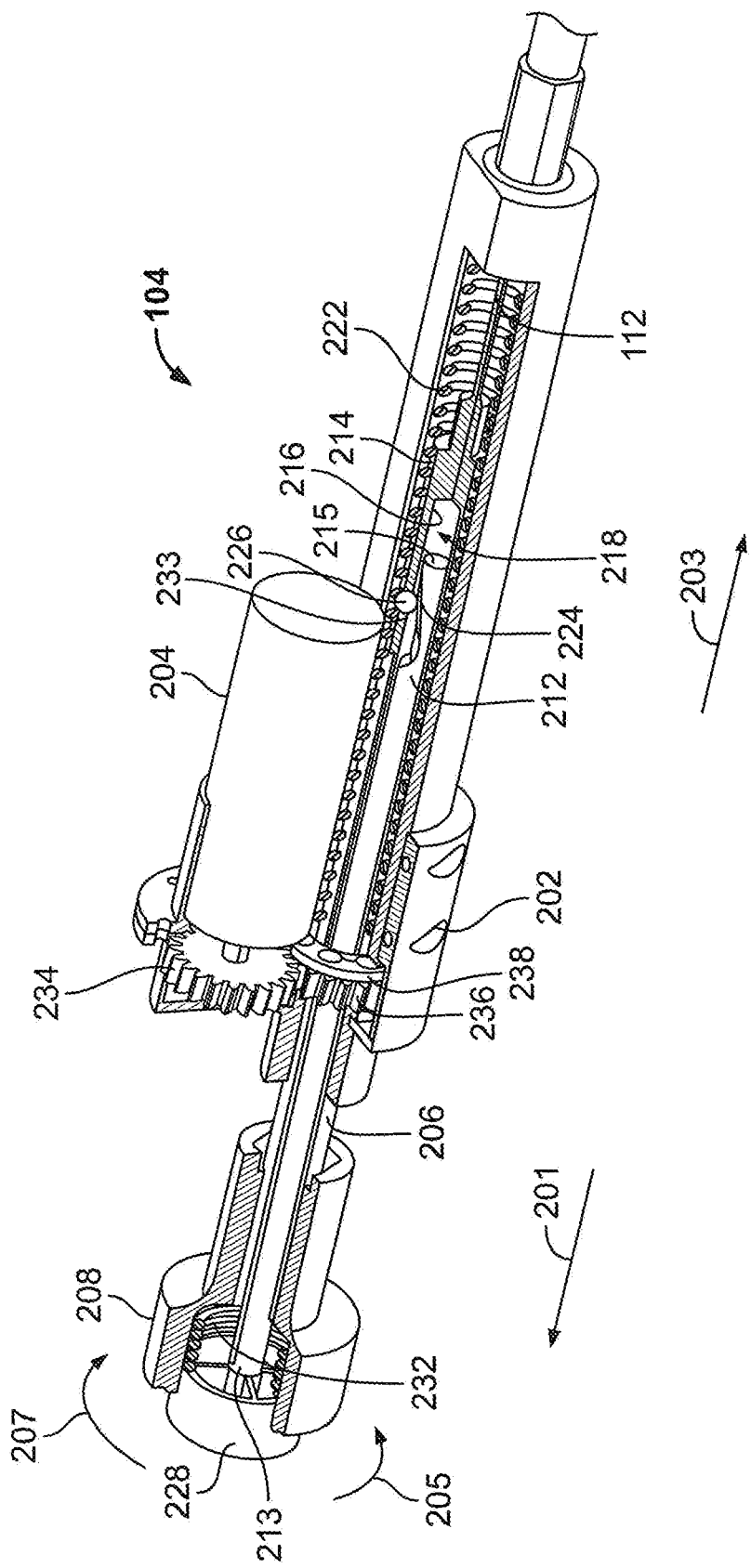
FIG. 2 depicts a partial cross section view of one embodiment of an actuator that may be used to implement the system of FIG. 1.

As FIG. 2 depicts, each actuator 104 includes a housing 202, a motor 204, a main rod 206, a control handle 208, and an inner rod 212. The motor 204 is mounted on the housing 202 and is coupled to receive motor control signals from, for example, the controller 102 (see FIG. 1). The motor 204 is responsive to the received motor control signals to rotate and supply a drive torque. It will be appreciated that the motor 204 may be implemented using any one of numerous types of AC or DC motors. In one particular embodiment, the motor 202 is implemented using a brushed DC motor.

The main rod 206 is disposed at least partially within the housing 202 and has an outer surface 214, and an inner surface 216 that defines a main rod cavity 218. The main rod 206 is coupled to receive the drive torque from the motor 204 and is configured, in response to the drive torque, to at least selectively translate in either a first axial direction 201 or a second axial direction 203. The main rod 206 is further configured to receive an axial drive force and is configured, in response to the axial drive force, to at least selectively translate in either the first axial direction 201 or the second axial direction 203. How this is accomplished will be described further below.

The control handle 208 is coupled to, and is movable with, the main rod 206. That is, the control handle 208 moves with the main rod 206 when the main rod 206 is receiving the drive torque or the axial drive force. Preferably, the control handle 208 is dimensioned to be grasped by a hand of, for example, a pilot (or other user), and to receive from, for example, the pilot, at least an axial force. The axial force supplied from the user to the control handle 208 is transferred, as the above-mentioned axial drive force, to the main rod 206. The control handle 208 may also receive from, for example, the user, a torque, which is in turn transferred to the main rod 206. That is, the user may rotate the control handle 208 in either a first rotational direction 205 or a second rotational direction 207. This, in turn, causes the main rod 206 to rotate in the first or second rotational direction, respectively.

The inner rod 212 is disposed within, and extends from, the main rod cavity 218. The inner rod includes a first end 213 and a second end 215, and is movable between a first position, which is the position depicted in FIG. 2, and a second position, which is not depicted but will be readily understood to those skilled in the art. When the inner rod 212 is in the first position, rotation of the main rod 206 causes the main rod 206 to translate. When the inner rod 212 is in the second position, rotation of the main rod 206 does not cause the main rod to translate 206; however, if an axial force is supplied to the control handle 208, the main rod 206 will translate. This functionality is provided by interaction of a helical guide 222, a ramped surface 224, a detent ball 226, each of which will be described in more detail momentarily.

Before doing so, however, it is noted that each actuator 104 also includes a knob 228 and a bias spring 232. The knob 228 is coupled to, and is movable with, the inner rod 212. More specifically, the knob 228, at least in the depicted embodiment, is coupled to the first end 213 of the inner rod 212. The bias spring 232 is disposed between, and engages the knob 228 and the control handle 208, and supplies a bias force to the knob 228 that urges the inner rod 212 in the first direction 201 and thus toward the first position.

As FIG. 2 depicts, the helical guide 222 surrounds at least a portion of the main rod 206. In the depicted embodiment, the helical guide 222 is implemented using a helical spring. It will be appreciated, however, that in other embodiments, it could be implemented as part of the housing that surrounds the main rod 202. The ramped surface 224 is formed on the inner rod 212, and more specifically adjacent to the second end 215. The detent ball 226 rests on the ramped surface 222 and is thus engaged by the inner rod 212. The detent ball 226 extends at least partially through an opening 233 that is formed in the main rod 206 and that extends between the inner surface 216 and the outer surface 214.

The detent ball 226 is movable between an engage position and a disengage position. The detent ball 226 is in the engage position when the inner rod 212 is in the first position. In the engage position, which is the position depicted in FIG. 2, the detent ball 226 engages the helical guide 222. The detent ball 226 is in the disengage position when the inner rod 212 is in the second position. In the disengage position, which is not depicted but will be readily understood to those skilled in the art, the detent ball 226 slides down the ramped surface 224 and thus does not engage the helical guide 222.

Thus, when the detent ball 226 is in the engage position, if a drive torque is supplied to the main rod 206, either manually or via the motor 204, the main rod 206 will translate. Of course, the main rod 206 will also translate if it is supplied with an axial force via, for example, a pilot (or other user). Conversely, when the detent ball 226 is in the disengage position, if a drive torque is supplied to the main rod 206, either manually or via the motor 204, the main rod 206 will not translate. However, the main rod 206 will translate if it is supplied with an axial force via, for example, a pilot (or other user).

Preferably, each actuator 104 additionally includes a drive gear 234, a driven gear 236, and an axial bearing 238. The drive gear 234 is coupled to the motor 204 to receive the drive torque therefrom. In the depicted embodiment, the drive gear 234 is directly connected to the motor 204, but in other embodiments there could be intervening components. The driven gear 236 is meshed with the drive gear 234. Thus, as is readily apparent to persons skilled in the art, the driven gear 236 rotates in response to rotation of the drive gear 234. The axial bearing 238 is disposed between the driven gear 236 and the housing 202 to reduce wear on the driven gear 236.

Figure 3:
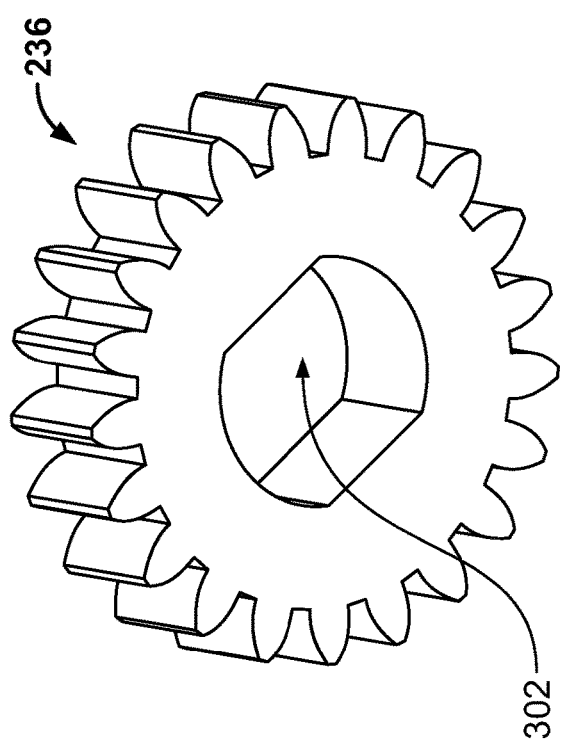
FIG. 3 depicts a plan view of a main rod that is implemented in the actuator of FIG. 2.
Figure 4:
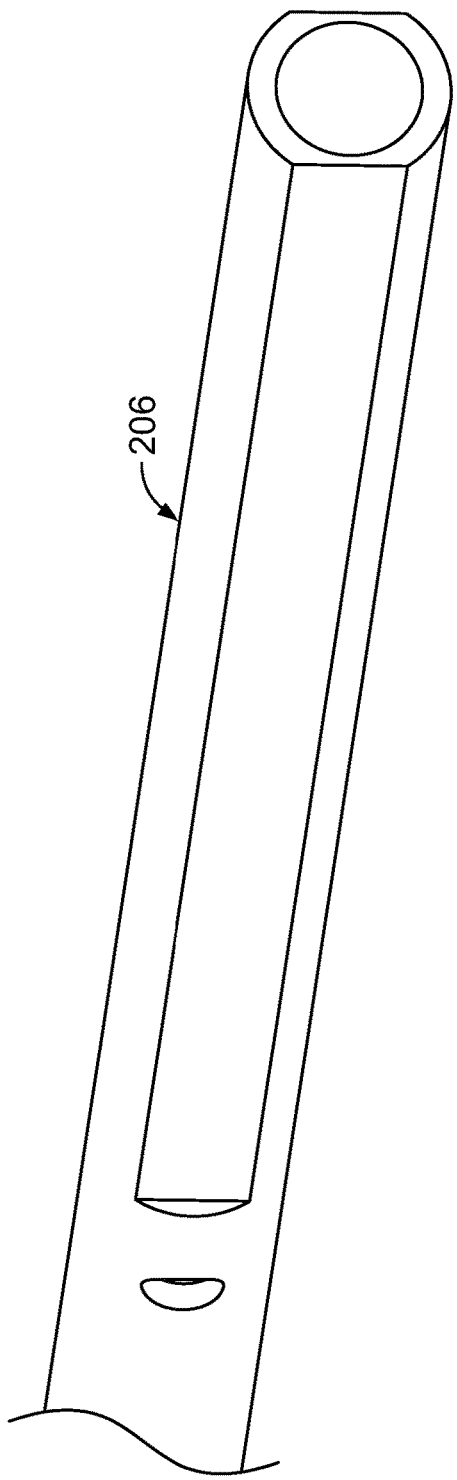
FIG. 4 depicts a plan view of a gear that is implemented in the actuator of FIG. 2.
Figure 5:
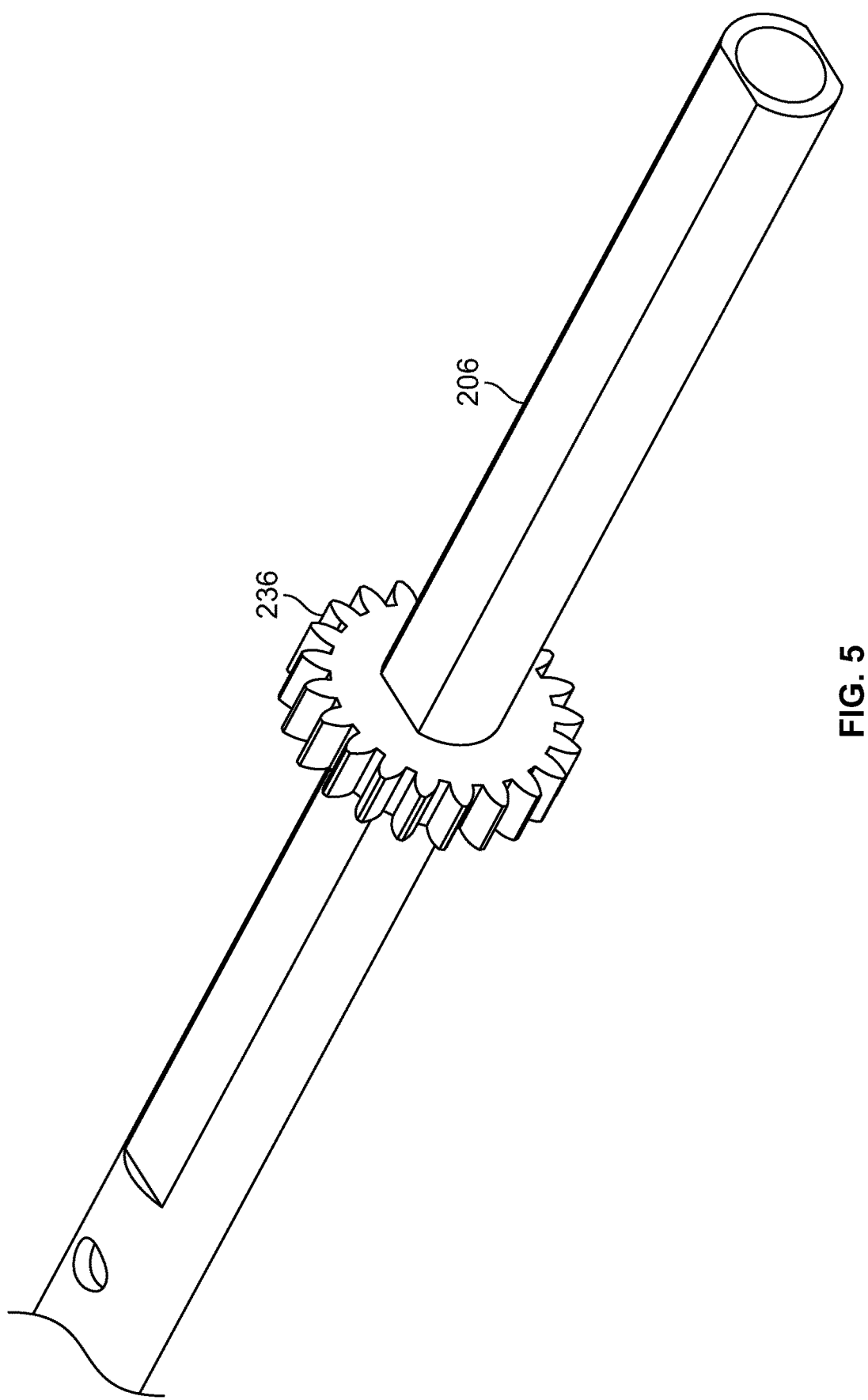
FIG. 5 a plan view of the main rod of FIG. 3 and the gear of FIG. 4 in an assembled configuration.

Referring now to FIGS. 3-5, it is seen that the driven gear 236 has an opening 302 formed therein. As FIGS. 3 and 4 depict, the cross-sectional shape of the opening 302 and the cross-sectional shape of at least a portion of the main rod 206 are substantially identical. The main rod 206, as shown most clearly in FIG. 5, extends through the opening 302, and is translatable relative to the driven gear 236. With this configuration, when the driven gear 236 is rotating, it engages the main rod 206, thereby supplying the drive torque from the motor 204, via the drive gear 234, to the main rod 206. As a result, the main rod 206 will translate, if the detent ball 226 is in the engage position.

During automated operation of the system 100, the controller 102, as noted previously, selectively supplies motor control signals to each of the actuators 104, and more specifically to each of the motors 204 on the actuators 104. Each motor 204, upon receipt of its associated motor control signals, supplies a drive torque to its associated drive gear 234, which is transferred, via its associated driven gear 236, to its associated main rod 206, causing the main rod 206 to rotate. Because each of the inner rods 212 will be in the first position, and thus the associated detent balls 226 will be in the engage position, rotation of the main rod 206 will cause it to translate.

If, however, one of the actuators 104 needs to be manually manipulated, the pilot (or other user) will press the knob 228 on the appropriate actuator 104, which will move the inner rod 212 from the first position to the second position. This, as noted previously, will cause the associated detent ball 226 to move from the engage position to the disengage position. This means translation of the main rod 206 is no longer responsive to its rotation. Rather, the main rod 206 translates in response to an axial force being supplied thereto via, for example, the control handle 208. Although the main rod 206 can be rotated, via the control handle 208, when the inner rod 212 is in the second position, its rotation will not cause translation.

It should be noted that the system 100 may additionally include a provision to prevent the motors 204 from being energized for rotation whenever an associated inner rod 212 is in the second position. In the depicted embodiment, as shown schematically in FIG. 1, each actuator may additionally include a switch 114 (114-1, 114-2, 114-3). Each switch is coupled to its associated knob 228 and is in operable communication with the controller 102. Each switch 114 is movable between an activate position and a deactivate position. Each switch 114 is in the activate position when its associated inner rod 212 is in the first position, and is in the deactivate position when the associated inner rod 212 is in the second position. In the activate position, the controller 102 is operable to at least selectively energize the associated motor 204. In the deactivate position, the controller 102 is operable to not energize the associated motor 204.

The system described herein can be readily retrofit into existing piston engine powered aircraft to automate the throttle, mixture, and (when included) propeller controls.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuation system for an aircraft piston engine, comprising:
    a controller configured to selectively supply motor control signals to a motor; and
    an actuator in operable communication with the controller, the actuator comprising:
        a housing;
        a motor mounted on the housing and coupled to receive the motor control signals, the motor responsive to the motor control signals to rotate and supply a drive torque;
        a main rod disposed at least partially within the housing and having an outer surface and an inner surface that defines a main rod cavity, the main rod coupled to receive the drive torque from the motor and configured, in response to the drive torque, to at least selectively translate in either a first axial direction or a second axial direction, the main rod further configured to receive an axial drive force and configured, in response to the axial drive force, to at least selectively translate in either the first axial direction or the second axial direction;
        a drive gear coupled to the motor to receive the drive torque therefrom;
        a driven gear meshed with the drive gear and having an opening therein through which the main rod extends, the driven gear at least selectively engaging the main rod when the driven gear is rotating to thereby supply the drive torque to the main rod;
        a control handle coupled to, and movable with, the main rod when the main rod is receiving the drive torque, the control handle dimensioned to be grasped by a hand and to receive at least an axial force; and
        an inner rod disposed within, and extending from, the main rod cavity, the inner rod movable between a first position and a second position,
    wherein:
        in the first position, rotation of the main rod causes the main rod to translate,
        in the second position, rotation of the main rod does not cause the main rod to translate, but application of the axial force to the control handle causes the main rod to translate, and
        the main rod is translatable relative to the driven gear.

2. The actuation system of claim 1, further comprising:
    an axial bearing disposed between the driven gear and the housing.

3. The actuation system of claim 1, further comprising:
an opening formed in the main rod and extending between the inner surface and the outer surface;
a helical guide surrounding at least a portion of the main rod; and
a detent ball engaged by the inner rod and extending at least partially through the opening, the detent ball movable between an engage position and a disengage position,
wherein:
in the engage position, the detent ball engages the helical guide, and
in the disengage position, the detent ball does not engage the helical guide.

4. The actuation system of claim 2, wherein:
the detent ball is in the engage position when the inner rod is in the first position; and
the detent ball is in the disengage position when the inner rod is in the second position.

5. The actuation system of claim 2, wherein the helical guide comprises a helical spring.

6. The actuation system of claim 1, further comprising:
a knob coupled to, and movable with, the inner rod; and
a spring disposed between and engaging the knob and the control handle, the spring supplying a bias force to the knob that urges the inner rod toward the first position.

7. The actuation system of claim 1, further comprising:
a switch coupled to the knob and in operable communication with the controller, the switch movable between an activate position and a deactivate position,
wherein:
in the activate position, the controller is operable to at least selectively energize the motor,
in the deactivate position, the controller is operable to not energize the motor,
the switch is in the activate position when the inner rod is in the first position, and
the switch is in the deactivate position when the inner rod is in the second position.

8. The actuation system of claim 1, further comprising:
a control cable coupled to and extending from the main rod.

9. An actuation system for an aircraft powered by a piston engine, the actuation system comprising:
a controller configured to selectively supply a plurality of motor control signals; and
a plurality of actuators in operable communication with the controller, wherein each actuator comprises:
a housing;
a motor mounted on the housing and coupled to receive one of the motor control signals from the controller, the motor responsive to the received motor control signals to rotate and supply a drive torque;
a main rod disposed at least partially within the housing and having an outer surface and an inner surface that defines a main rod cavity, the main rod coupled to receive the drive torque from the motor and configured, in response to the drive torque, to at least selectively translate in either a first axial direction or a second axial direction, the main rod further configured to receive an axial drive force and configured, in response to the axial drive force, to at least selectively translate in either the first axial direction or the second axial direction;
a drive gear coupled to the motor to receive the drive torque therefrom;
a driven gear meshed with the drive gear and having an opening therein through which the main rod extends, the driven gear at least selectively engaging the main rod when the driven gear is rotating to thereby supply the drive torque to the main rod;
a control handle coupled to, and movable with, the main rod when the main rod is receiving the drive torque, the control handle dimensioned to be grasped by a hand and to receive at least an axial force; and
an inner rod disposed within, and extending from, the main rod cavity, the inner rod movable between a first position and a second position,
wherein:
in the first position, rotation of the main rod causes the main rod to translate,
in the second position, rotation of the main rod does not cause the main rod to translate, but application of the axial force to the control handle causes the main rod to translate, and
the main rod is translatable relative to the driven gear.

10. The actuation system of claim 9, wherein each actuator further comprises:
an axial bearing disposed between the driven gear and the housing.

11. The actuation system of claim 9, wherein each actuator further comprises:
an opening formed in the main rod and extending between the inner surface and the outer surface;
a helical guide surrounding at least a portion of the main rod; and
a detent ball engaged by the inner rod and extending at least partially through the opening, the detent ball movable between an engage position and a disengage position,
wherein:
in the engage position, the detent ball engages the helical guide, and
in the disengage position, the detent ball does not engage the helical guide.

12. The actuation system of claim 11, wherein:
the detent ball is in the engage position when the inner rod is in the first position; and
the detent ball is in the disengage position when the inner rod is in the second position.

13. The actuation system of claim 11, wherein the helical guide comprises a helical spring.

14. The actuation system of claim 9, wherein each actuator further comprises:
a knob coupled to, and movable with, the inner rod; and
a spring disposed between and engaging the knob and the control handle, the spring supplying a bias force to the knob that urges the inner rod toward the first position.

15. The actuation system of claim 9, wherein each actuator further comprises:
a switch coupled to the knob and in operable communication with the controller, the switch movable between an activate position and a deactivate position,
wherein:
in the activate position, the controller is operable to at least selectively energize the motor,
in the deactivate position, the controller is operable to not energize the motor,
the switch is in the activate position when the inner rod is in the first position, and
the switch is in the deactivate position when the inner rod is in the second position.

16. The actuation system of claim 9, wherein each actuator further comprises:
a control cable coupled to and extending from the main rod.

* * * * *

UNITED STATES PATENT AND TRADEMARK OFFICE
CERTIFICATE OF CORRECTION

| | |
|---|---|
| PATENT NO. | : 11,548,654 B2 |
| APPLICATION NO. | : 17/063118 |
| DATED | : January 10, 2023 |
| INVENTOR(S) | : Boris Novosad and Jan Tomas |

It is certified that error appears in the above-identified patent and that said Letters Patent is hereby corrected as shown below:

In the Claims

Column 9, Line 16 (Claim 4), "claim 2" should be --claim 3--

Column 9, Line 21 (Claim 5), "claim 2" should be --claim 3--

Signed and Sealed this
Second Day of July, 2024

Katherine Kelly Vidal
*Director of the United States Patent and Trademark Office*